United States Patent
Uchida et al.

(10) Patent No.: US 9,139,915 B2
(45) Date of Patent: *Sep. 22, 2015

(54) SOLUTION FOR REMOVING ALUMINUM OXIDE FILM AND METHOD FOR SURFACE TREATMENT OF ALUMINUM OR ALUMINUM ALLOY

(75) Inventors: Hiroki Uchida, Hirakata (JP); Kazuki Yoshikawa, Hirakata (JP); Toshiaki Shibata, Hirakata (JP)

(73) Assignee: C. Uyemura & Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/185,181

(22) Filed: Jul. 18, 2011

(65) Prior Publication Data

US 2011/0268885 A1 Nov. 3, 2011

Related U.S. Application Data

(62) Division of application No. 12/007,484, filed on Jan. 10, 2008, now abandoned.

(30) Foreign Application Priority Data

Jan. 12, 2007 (JP) .................................. 2007-004708

(51) Int. Cl.
  *B44C 1/22* (2006.01)
  *C23G 1/22* (2006.01)
  (Continued)

(52) U.S. Cl.
  CPC . *C23G 1/22* (2013.01); *C09K 13/02* (2013.01); *C23C 18/54* (2013.01)

(58) Field of Classification Search
  None
  See application file for complete search history.

(56) References Cited

U.S. PATENT DOCUMENTS

| 4,018,628 | A | * | 4/1977 | Paulet | 148/272 |
| 4,088,544 | A | * | 5/1978 | Hutkin | 428/545 |
| 5,578,187 | A | * | 11/1996 | Zitko et al. | 205/191 |

(Continued)

FOREIGN PATENT DOCUMENTS

| JP | 1-247578 A | 10/1989 |
| JP | 5-65657 A | 3/1993 |

(Continued)

OTHER PUBLICATIONS

Japanese Office Action, dated Jan. 25, 2012, for Japanese Application No. 2007-004708.

(Continued)

*Primary Examiner* — Anita Alanko
(74) *Attorney, Agent, or Firm* — Birch, Stewart, Kolasch & Birch, LLP

(57) ABSTRACT

A solution for removing an aluminum oxide film from an aluminum or aluminum alloy surface, which includes a salt or oxide of a metal capable of substituting aluminum, a solubilizing agent for ions of the metal, and an alkali, and which has a pH of 10 to 13.5. The removing solution makes it possible to form a film of the metal derived from the metal salt or oxide contained in the removing solution by dissolving away the oxide film from the aluminum or aluminum alloy surface at a low temperature and a high speed while restraining, as securely as possible, erosion of the aluminum or aluminum alloy surface. The removing solution ensures that even in the case where the thickness of the aluminum or aluminum alloy basis material is very small, the aluminum or aluminum alloy surface can be activated while assuredly leaving the aluminum or aluminum alloy basis material.

20 Claims, 2 Drawing Sheets

(51) Int. Cl.
*C09K 13/02* (2006.01)
*C23C 18/54* (2006.01)

(56) References Cited

U.S. PATENT DOCUMENTS

| | | | |
|---|---|---|---|
| 6,080,447 | A | 6/2000 | Ferroni et al. |
| 6,183,880 | B1 * | 2/2001 | Yoshioka et al. ............ 428/607 |
| 6,969,164 | B2 * | 11/2005 | Kerr et al. ....................... 347/86 |
| 7,470,562 | B2 * | 12/2008 | Kim et al. ...................... 438/104 |
| 2002/0068454 | A1 | 6/2002 | Sun et al. |
| 2003/0041526 | A1 | 3/2003 | Fujii et al. |
| 2010/0044341 | A1 * | 2/2010 | Uchida et al. ................... 216/37 |
| 2011/0315658 | A1 * | 12/2011 | Shibata et al. .................. 216/37 |
| 2012/0058276 | A1 * | 3/2012 | Uchida et al. ................. 427/309 |

FOREIGN PATENT DOCUMENTS

| | | | | |
|---|---|---|---|---|
| JP | 6-240467 | A | | 8/1994 |
| JP | 9-53182 | A | | 2/1997 |
| JP | 09053182 | A | * | 2/1997 |
| JP | 2001-200390 | A | | 7/2001 |
| JP | 2001-316831 | A | | 11/2001 |
| JP | 2002-151537 | A | | 5/2002 |
| JP | 2002-514683 | A | | 5/2002 |
| JP | 2004-263267 | A | | 9/2004 |
| JP | 2004263267 | A | * | 9/2004 ............... C25D 5/44 |
| JP | 2006-13399 | A | | 1/2006 |

OTHER PUBLICATIONS

Japanese Office Action dated Apr. 18, 2012, for Application No. 2007-004708.

Office Action for corresponding Japanese Patent Application No. 2007-004708, dated Oct. 17, 2012.

The Office Action, dated Feb. 11, 2014, issued in the corresponding Korean Patent Application No. 10-2008-0002882.

* cited by examiner

SOLUTION FOR REMOVING ALUMINUM OXIDE FILM AND METHOD FOR SURFACE TREATMENT OF ALUMINUM OR ALUMINUM ALLOY

This application is a Divisional of application Ser. No. 12/007,484, filed on Jan. 10, 2008, now abandoned, and claims priority under 35 U.S.C. §119(a) to Patent Application No. 2007-004708 filed in Japan on Jan. 12, 2007, all of which are hereby expressly incorporated by reference into the present application.

BACKGROUND OF THE INVENTION

The present invention relates to a solution for removing an aluminum oxide film and a surface treatment method for aluminum or an aluminum alloy, particularly to a solution for removing an aluminum oxide film and a surface treatment method for aluminum or an aluminum alloy which are effective when used in or as a pre-treatment in forming a UBM (under-bump metal) or bumps on a wafer by plating.

As a method for forming a UBM or bumps on a silicon wafer, there has been used a method including the steps of subjecting aluminum thin film electrodes patterned on a wafer to a zinc substitution treatment so as to form a zinc film and then performing electroless plating to form bumps, a method including the steps of conducting a palladium treatment in place of the just-mentioned zinc substitution treatment and then performing electroless plating to form bumps, or a method including the steps of directly replacing the surfaces of aluminum thin film electrodes with nickel and then performing autocatalytic electroless plating to form bumps.

Here, irrespectively of the method selectively used to form the UBM or bumps, a degreasing treatment of the aluminum thin film electrodes, a treatment for removing an aluminum oxide film, metallic impurities or the like present on the aluminum thin film electrodes or the like treatment is ordinarily conducted as a pretreatment. In this case, an aluminum oxide film produced in an extremely small thickness upon immersion in nitric acid or the like can be subjected directly to a plating treatment in the subsequent step to thereby achieve the desired plating without any problem. On the other hand, in the case where a rigid aluminum oxide film generated through such a manufacturing step as a grinding step and an annealing step is left on the surface of the workpiece, the plating film formed in the subsequent step may show insufficient adhesion or pits may be formed in the plating film, and, in worse conditions, the desired plating film may not be deposited successfully. Therefore, it is desirable to remove such a rigid aluminum oxide film completely before plating.

To cope with such a problem, a method in which a substrate for plating is formed by a dry process without conducting dissolution of the aluminum oxide film has been proposed (refer to Japanese Patent Laid-open No. Hei 11-87392). However, the method has room for improvement in that it involves complicated steps and it is disadvantageous from the viewpoints of speediness and production cost. Furthermore, the method has the problem that the non-conductive property of the remaining oxide film leads to an increased thermal resistance, resulting in worsening of electrical properties.

Removal of the rigid aluminum oxide film has been carried out by a wet method. Specifically, the oxide film has been removed by a method in which the workpiece is immersed in a strong alkaline solution or acidic solution so as to completely remove the oxide film while partly dissolving the underlying aluminum or aluminum alloy basis material.

While this method may be satisfactory where the aluminum or aluminum alloy basis material is thick, it becomes very difficult to secure a margin of etching when the thickness of the aluminum or aluminum alloy basis material is reduced to 0.5 µM or 1.0 µm.

In addition, a method in which an organic solvent is used (refer to Japanese Patent Laid-open No. 2002-151537), a method in which a mixture of several acids is used (refer to Japanese Patent Laid-open No. Hei 5-65657 and JP-A-2002-514683) and the like have also been proposed.

However, in these methods, considerable etching of the aluminum or aluminum alloy basis material cannot be obviated, and, where the basis material is a thin film, the thin film would be lost or dissolved; therefore, it is difficult to select appropriate treatment conditions. Furthermore, a grinding or other mechanical polishing step cannot be adopted for the thin film, unlike the case of die casting. Therefore, the oxide film formed through a heat treatment in the manufacturing process would be left on the surface of the aluminum thin film, which worsens the situation.

Incidentally, Japanese Patent Laid-open No. 2004-263267 is also mentioned as a related-art document.

SUMMARY OF THE INVENTION

The present invention has been made in consideration of the above-mentioned circumstances. Accordingly, it is an object of the invention to provide a removing solution for an aluminum oxide film and a surface treatment method for aluminum or an aluminum alloy using the removing solution by which it is possible to remove a rigid oxide film easily, speedily and assuredly without excessively etching an aluminum or aluminum alloy surface and to effectively treat even a workpiece provided with an aluminum or aluminum alloy thin film on the surface thereof.

The present inventors made intensive and extensive investigations for attaining the above object. As a result of the investigations, it was found out that when an aluminum oxide film formed on aluminum or an aluminum alloy is treated with a removing solution which including a metallic salt or oxide containing a metal capable of substituting aluminum, a solubilizing agent for ions of the metal, an alkali and, optionally, a surfactant and which has a pH of 10 to 13.5, the oxide film can be speedily removed at a low temperature while restraining, as securely as possible, the erosion of the aluminum or aluminum alloy surface.

Specifically, the cause of the considerable erosion of an aluminum or aluminum alloy basis material which would occur at the time of removing an aluminum oxide film by use of a prior art removing solution containing an acid as a main component lies in that it would be impossible to effectively cope with the difference between the reactivity between the aluminum oxide film and the acid and the reactivity between the aluminum or aluminum alloy basis material and the acid.

FIG. 2 shows schematic sectional views showing the manner in which an aluminum or aluminum alloy surface is activated by use of a prior art treating solution containing an acid as a main component, wherein FIGS. 2A to 2D respectively show stages of a process of removing the oxide film from the aluminum or aluminum alloy surface by use of a prior art treating solution.

Ordinarily, the thickness of the aluminum oxide film 2 is not uniform, and the acidic treating solution 31 for removing the aluminum oxide film 2 does not behave uniformly. Therefore, as dissolution of the aluminum oxide film 2 proceeds, the base material of the aluminum or aluminum alloy 1 is first exposed partially (FIG. 2A).

Here, since the reactivity between the aluminum or aluminum alloy 1 and the acid (acidic treating solution) 31 is higher than the reactivity between the aluminum oxide film 2 and the acid 31, a reaction as represented by the following formula (1) proceeds preferentially, so that the aluminum or aluminum alloy 1 is dissolved preferentially (FIG. 2B). In this instance, the pH in the vicinity of reaction points is relatively raised due to consumption of hydrogen ions, and the concentration of aluminum(III) hydroxide is raised due to a reaction as represented by the following formula (2). The rise in the concentration of aluminum(III) hydroxide leads to further suppression of the dissolution of the aluminum oxide film 2.

$$2Al + 6H^+ \rightarrow 2Al^{3+} + 3H_2 \quad (1)$$

$$Al^{3+} + 3OH^- \rightarrow Al(OH)_3 \quad (2)$$

As the workpiece is immersed in the treating solution further, the dissolution of the aluminum or aluminum alloy 1 proceeds further, resulting in that the aluminum or aluminum alloy 1 underlying the aluminum oxide film 2 is dissolved away (FIG. 2C). Eventually, the aluminum oxide film 2 is physically delaminated, resulting in that the aluminum oxide film having been present on the surface of the aluminum or aluminum alloy basis material is removed (FIG. 2D).

In the case where the prior art treating solution containing an acid as a main component is used, the aluminum oxide film is removed through the just-mentioned stages, so that the considerable erosion of the aluminum or aluminum alloy basis material is unavoidable. Therefore, this method has been utterly inapplicable to the case where the workpiece to be deprived of an aluminum oxide film is a thin layer, such as an aluminum thin film electrode on a silicon wafer.

On the other hand, as a result of the present inventors' investigations in seeking a method for dissolving away an aluminum oxide film while obviating a high reactivity between an aluminum or aluminum alloy basis material and an acid, they found out that an alkaline (basic) removing solution with a salt or oxide of a metal capable of substituting aluminum added thereto together with a solubilizing agent for the ions of the metal is effective, as above-mentioned.

More specifically, FIG. 1 shows schematic sectional views showing the manner in which an aluminum oxide film present on an aluminum or aluminum alloy surface is removed by use of a removing solution based on the present invention, wherein FIG. 1A is a stage in which the aluminum or aluminum alloy basis material is partially exposed, like in the prior art example shown in FIG. 2A.

Here, a metallic film 4 derived from the salt or oxide of that metal capable of substituting aluminum which is contained in the removing solution (alkaline removing solution) 3 based on the present invention is swiftly formed in the areas where the aluminum or aluminum alloy 1 is exposed (FIG. 1B).

Since aluminum in the aluminum oxide film 2 has already been ionized, the metallic film derived from the metallic salt or oxide would not be formed on the aluminum oxide film 2. In addition, the aluminum or aluminum alloy 1 would not be eroded, since it is protected by that metallic film 4 derived from the salt or oxide of the metal capable of substituting aluminum which has been formed on the exposed portions of the aluminum or aluminum alloy 1. Therefore, as this reaction continues, the metallic film 4 derived from the salt or oxide of the metal capable of substituting aluminum is sequentially formed on those portions of the aluminum or aluminum alloy 1 which are exposed attendant on the progress of the dissolution of the aluminum oxide film 2 (FIG. 1C). Eventually, the aluminum oxide film 2 having been present on the surface of the aluminum or aluminum alloy 1 is completely dissolved away. On the other hand, the aluminum or aluminum alloy surface is wholly covered with the metallic film 4 derived from the salt or oxide of the metal capable of substituting aluminum (FIG. 1D).

In short, as shown in FIG. 1, when the removing solution based on the present invention is used, the aluminum or aluminum alloy basis material exposed by etching is immediately coated with the substituent metal layer, so that erosion of the aluminum or aluminum alloy basis material is restrained. In addition, the dissolution of the aluminum oxide film would not be suppressed due to an increase in the concentration of aluminum hydroxide attendant on dissolution of the aluminum or aluminum alloy basis material, so that effective removal of the aluminum oxide film will proceed continuedly.

Besides, with the removing solution made to be alkaline (basic), the number of hydroxide (OH⁻) ions is increased, and, since the hydroxide (OH⁻) ions have a strong behavior of dissolving the aluminum oxide film, the intended treatment can be carried out at a lower temperature and in a shorter time, as compared with the case of using an acidic treating solution. Further, though the reactivity between the removing solution and the metallic aluminum of the basis material is also high where the removing solution is alkaline (basic), it was found out that this problem can be solved by suppressing the alkalinity (pH), which is an index of the concentration of free alkali (base). Based on the finding, the present invention has been completed.

Therefore, the removing solution containing the metal capable of substituting aluminum based on the present invention is a removing solution with which it is possible to dissolve away an aluminum oxide film continuedly at a low temperature and speedily, while minimizing erosion of an aluminum or aluminum alloy basis material, through a wet process.

Accordingly, the present invention provides the following solutions for removing an aluminum oxide film and the following methods for surface treatment of aluminum or an aluminum alloy.

(1): A solution for removing an aluminum oxide film from an aluminum or aluminum alloy surface, comprising a salt or oxide of a metal capable of substituting aluminum, a solubilizing agent for ions of the metal, and an alkali and having a pH of 10 to 13.5.

(2): The solution for removing the aluminum oxide film of (1), further comprising a surfactant.

(3): A method for surface treatment of aluminum or the aluminum alloy, comprising the steps of:
immersing a workpiece having aluminum or the aluminum alloy at least at the surface in the solution of (1), and
forming a substituent metal layer of the metal capable of substituting aluminum and contained in the solution on the aluminum or aluminum alloy surface while removing the aluminum oxide film from the aluminum or the aluminum alloy surface.

(4): The method for surface treatment of aluminum or the aluminum alloy of (3), wherein the workpiece is a body having the aluminum or aluminum alloy film formed on a surface of a non-aluminum material.

(5): The method for surface treatment of aluminum or the aluminum alloy of (3), wherein after the substituent metal layer is formed, a plating layer is formed.

(6): The method for surface treatment of aluminum or the aluminum alloy of (3), wherein after the substituent metal layer is formed, the substituent metal layer is removed by an acidic liquid having an oxidizing behavior.

(7): The method for surface treatment of aluminum or the aluminum alloy of (6), wherein after the substituent metal layer is removed by the acidic liquid having the oxidizing behavior, the aluminum or aluminum alloy is subjected to a zinc substitution treatment or a palladium treatment and is then plated.

(8): The method for surface treatment of aluminum or the aluminum alloy of (6), wherein after the substituent metal layer is removed by the acidic liquid having the oxidizing behavior, the aluminum or aluminum alloy is subjected directly to plating.

The removing solution based on the present invention makes it possible to form a metallic film, derived from the salt or oxide of the metal contained in the removing solution, on an aluminum or aluminum alloy surface while restraining as securely as possible the erosion of the aluminum or aluminum alloy surface, and the metallic film thus formed can be dissolved away speedily at a low temperature without substantially eroding the aluminum or aluminum alloy surface. Therefore, by use of the removing method, the aluminum or aluminum alloy surface can be activated while securely leaving the aluminum or aluminum alloy basis material even where the thickness of the aluminum or aluminum alloy basis material is very small. The surface treatment method based on the present invention can be preferably used in the case of, for example, an activating treatment for the surfaces of aluminum thin film electrodes formed on a silicon wafer, particularly.

DETAILED DESCRIPTION OF THE INVENTION

Figure 1A:
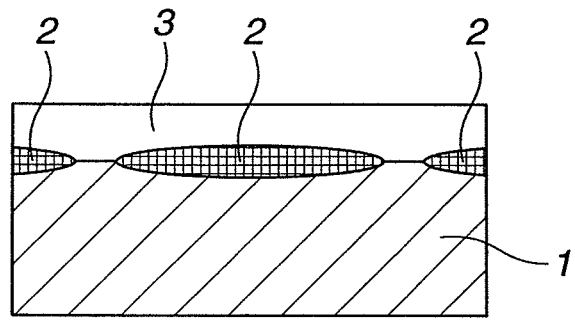
FIGS. 1A to 1D are schematic sectional views sequentially showing the manner in which an aluminum oxide film is removed from an aluminum or aluminum alloy surface by use of a removing solution based on the present invention.
Figure 1B:
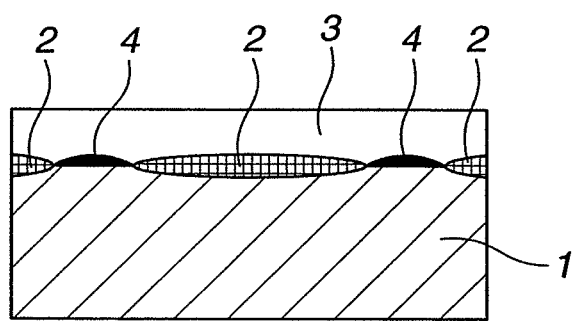
Figure 1C:
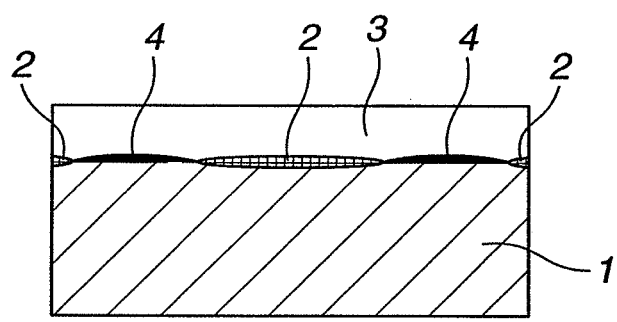
Figure 1D:
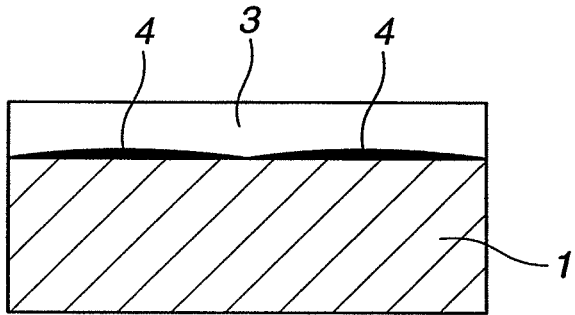
Figure 2A:
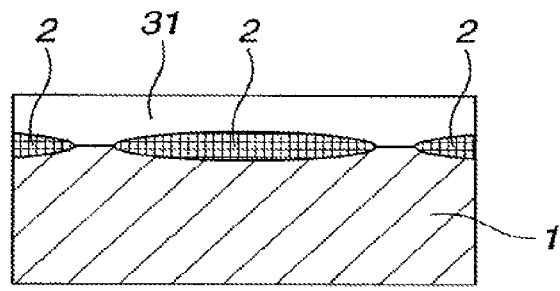
FIGS. 2A to 2D are schematic sectional views sequentially showing the manner in which an aluminum oxide film is removed from an aluminum or aluminum alloy surface by use of a removing solution according to a prior art.
Figure 2B:
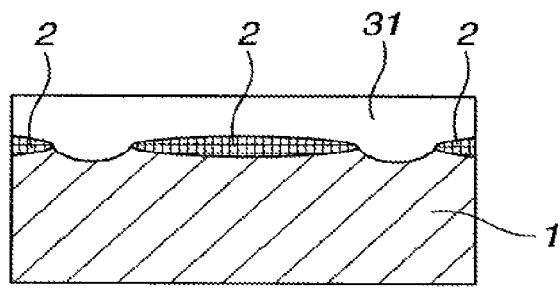
Figure 2C:
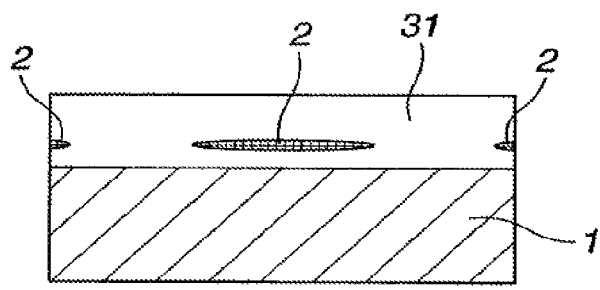
Figure 2D:
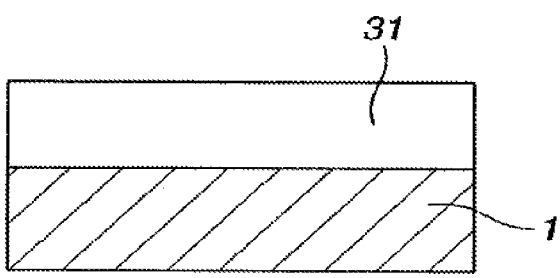

Now, the present invention will be described more in detail below.

The removing solution for an aluminum oxide film based on the present invention contains a salt or oxide of a metal capable of substituting aluminum, a solubilizing agent for ions of the metal, and an alkali, and has a pH of 10 to 13.5.

The metal constituting the metal salt or metal oxide contained in the removing solution based on the present invention is not particularly limited insofar as it is a metal capable of substituting aluminum. It is preferable that the metal is a metal lower than aluminum in ionization tendency, such as manganese, zinc, iron, cobalt, nickel, tin, lead, copper, mercury, silver, platinum, gold, and palladium. Examples of the metal salt include water-soluble salts, such as nitrates and sulfates, of the metal as just-mentioned. Among these metals, manganese and zinc are preferred because they little differ in oxidation-reduction potential from aluminum serving as the basis material.

The concentration of the metal salt or metal oxide used in the removing solution based on the present invention is not particularly limited, and is normally not less than 1 ppm (mg/L), preferably, not less than 10 ppm (mg/L) and normally not more than 10,000 ppm (mg/L), preferably, not more than 5,000 ppm (mg/L) in terms of metal amount. If the concentration of the metal salt or metal oxide is too low, the metal may not sufficiently substitute aluminum present as the basis material, or it may become necessary to replenish the metal salt or metal oxide. On the other hand, if the concentration is too high, in the case where the aluminum or aluminum alloy basis material is electrodes patterned on a wafer, the removing solution may erode other members than the aluminum or aluminum alloy basis material, or the metal may be deposited even on other members than the aluminum or aluminum alloy basis material.

The solubilizing agent for the metal ions contained in the removing solution based on the present invention is not particularly limited; normally, complexing agents and chelating agents can be used. Specific examples of the agents that can be used include hydroxycarboxylic acids such as glycolic acid, lactic acid, malic acid, tartaric acid, citric acid, gluconic acid, heptogluconic acid, etc. and their salts; aminocarboxylic acids such as glycine, aminodicarboxylic acid, nitrilotriacetic acid, EDTA, hydroxyethylethylenediaminetriacetic acid, diethylenetriaminepentaacetic acid, polyaminopolycarboxylic acid, etc. and their salts; phosphorous acid chelating agents such as HEDP, aminotrimethylphosphonic acid, ethylenediaminetetramethylphosphonic acid, etc. and their salts; and amine chelating agents such as ethylenediamine, diethylenetriamine, triethylenetetramine, etc.

The concentration of the solubilizing agent used in the removing solution based on the present invention is not particularly limited, and the total concentration of the solubilizing agent(s) is preferably 0.5 to 10 times (molar ratio), more preferably 0.8 to 5 times (molar ratio) that of the metal salt used.

The alkali contained in the removing solution based on the present invention is not particularly limited, but the alkali has to be an alkali (base) which will dissolve the oxide film. Examples of the alkali which can be used include alkali metal hydroxides such as LiOH, NaOH, KOH, etc. and quaternary ammonium hydroxides such as tetramethylammonium hydroxide (TMAH), choline, etc. Incidentally, the amount of the alkali added is such an amount as to bring the pH of the removing solution into the specified range of 10 to 13.5, preferably, 11 to 13. If the pH is less than 10, the rate of dissolution is lowered markedly, whereas if the pH exceeds 13.5, the dissolution rate becomes too high to control.

The oxide film removing solution for aluminum or an aluminum alloy based on the present invention, preferably, contains a surfactant, from the viewpoint of imparting water wettability. The surfactant used here is not particularly limited. Examples of the surfactant which can be used include nonionic surfactants such as polyethylene glycol, polyoxyethylene-oxypropylene block copolymer surfactant, etc. and, further, anionic and cationic surfactants. Among these surfactants, nonionic and anionic surfactants are preferred from the viewpoint of uniform treatability. These surfactants may be used either singly or in combination of two or more of them.

For example, where polyethylene glycol is used as the surfactant, its molecular weight is not particularly limited, and is normally not less than 100, preferably not less than 200 and normally not more than 20,000, preferably not more than 6,000. If the molecular weight is too high, the polyethylene glycol may be poor in solubility, whereas if the molecular weight is too low, water wettability may not be obtained successfully. Incidentally, as the polyethylene glycol, those which are commercially available can be used.

Besides, the concentration of the surfactant in the removing solution is not particularly limited. The concentration is normally not less than 1 ppm (mg/L), preferably not less than 10 ppm (mg/L) and is normally not more than 5,000 ppm (mg/L), preferably not more than 2,000 ppm (mg/L). If the concentration of the surfactant in the removing solution is too low, the effect on water wettability obtained by the addition of the surfactant may be low. On the other hand, if the concentration is too high, the substituent metal may be deposited on other members than the aluminum or aluminum alloy basis material.

Incidentally, the removing solution based on the present invention is preferably prepared as an aqueous solution, from the viewpoint of safety in handling. However, other solvents such as methanol, ethanol, IPA, etc. may be used, either as they are or in mixture with water. Incidentally, these solvents may be used either singly or in combination of two or more of them.

The method of surface treating a workpiece by use of the removing solution as above-described is conducted as follows. A workpiece provided with aluminum or an aluminum alloy at least at a surface thereof is immersed in the removing solution, whereby a metallic film (substituent metal layer) of the metal derived from the metal salt or metal oxide contained in the removing solution is formed on the aluminum or aluminum alloy surface of the workpiece. In this case, after the metallic film is formed, the metallic film can be removed by use of an acidic liquid having an oxidizing behavior. Besides, the metallic film or the aluminum or aluminum alloy deprived of the metallic film may be subjected directly to plating or subjected to plating after undergoing a zinc substitution treatment or a palladium treatment.

The immersion conditions in immersing the workpiece having aluminum or an aluminum alloy in the removing solution are not particularly limited, and can be appropriately set taking the thickness of the aluminum oxide film to be removed, etc. into account. The immersion time is normally not less than 1 minute, preferably not less than 2 minutes and is normally not more than 20 minutes, preferably not more than 15 minutes. If the immersion time is too short, the substitution may not proceed sufficiently and the oxide film may be removed insufficiently. On the other hand, if the immersion time is too long, the removing solution may penetrate through small holes in the substituent metal layer, possibly leading to elution of aluminum or the aluminum alloy.

In addition, the temperature at the time of immersion is not particularly limited. The immersion temperature is normally not less than 20° C., preferably not less than 25° C. and is normally not more than 100° C., preferably not more than 95° C. If the immersion temperature is too low, dissolution of the oxide film may not be achieved. On the other hand, if the immersion temperature is too high, other members than the aluminum or aluminum alloy basis material may be eroded. Incidentally, the immersion is preferably attended by agitation of the solution or oscillation of the workpiece, from the viewpoint of achieving a uniform treatment.

The workpiece having aluminum or an aluminum alloy at least at a surface thereof which is under consideration in the present invention may be a workpiece formed entirely of aluminum or the aluminum alloy, or may be a workpiece in which the surface of a non-aluminum member (for example, silicon or FRA (substrate of printed wiring board)) is wholly or partly coated with aluminum or the aluminum alloy. In addition, the form of aluminum or the aluminum alloy is also not particularly limited. Favorable examples of the applicable form include a blank material, a rolled material, a cast material, a coating film, etc. Incidentally, in the case where an aluminum or aluminum alloy coating film is formed on a surface of a non-aluminum member, the coating film forming method is not particularly limited. Favorable examples of the coating film forming method include gaseous phase plating methods such as vacuum evaporation, sputtering, ion plating, etc.

The thickness of the coating film is normally not less than 0.5 µm, preferably not less than 1 µm, from the viewpoint of securely leaving the aluminum or aluminum alloy basis material in using the surface treatment method based on the present invention. Incidentally, there is no particular upper limit to the thickness, and the thickness is normally up to 100 µm. It should be noted here that since the removing solution based on the present invention will scarcely erode the aluminum or aluminum alloy basis material, the removing solution can effectively be used particularly for coating films with a thickness of not more than 1.0 µm, to which the treating solutions in a prior art could not be applied because of the problem that the basis material would be too thin after the treatment.

Furthermore, the constituent of the coating film is not particularly limited insofar as it is aluminum or an aluminum alloy. For example, the surface treatment method based on the present invention can be favorably applied to coating films of Al—Si (Si content: 0.5 to 1.0 wt %), Al—Cu (Cu content: 0.5 to 1.0 wt %), etc.

After the above-mentioned workpiece is immersed in the removing solution based on the present invention, the metallic film formed on the surface of the workpiece (the layer of the substituent metal derived from the salt or oxide of that metal capable of substituting aluminum which is contained in the removing solution based on the present invention) is preferably removed before a post-treatment, in the case where the adhesion of the film may possibly lowered at the time of the subsequent treatment or in the case where such a metallic layer is inherently unnecessary.

In dissolving the metallic film, an acidic liquid having an oxidizing behavior is used, from the viewpoint of moderating the reactivity with aluminum or the aluminum alloy present as the basis material. In this case, preferable examples of the acidic liquid having an oxidizing behavior include acids having an oxidizing behavior such as nitric acid, etc. and aqueous solutions thereof; and solutions obtained by adding at least one oxidizing agent, such as hydrogen peroxide, sodium persulfate, ammonium persulfate, potassium persulfate, etc. to an acid not having an oxidizing behavior, such as sulfuric acid, hydrochloric acid, etc. In this case, the acid has the behavior of dissolving the substituent metal, while the oxidizing agent has the behavior of moderating the reactivity with the aluminum or aluminum alloy basis material. Incidentally, among the oxidizing agents, hydrogen peroxide is preferred because it consists of hydrogen and oxygen and it is converted to water when reduced. Besides, sodium persulfate and potassium persulfate are preferred, from the viewpoints of stability and easiness to handle.

Where nitric acid is used as the acid (and oxidizing agent), the amount of nitric acid in the dissolving liquid (aqueous solution) is normally not less than 200 ml/L, preferably not less than 300 ml/L and is normally not more than 1,000 ml/L, preferably not more than 700 ml/L. If the amount of nitric acid is too small, the oxidizing power is so low that the reaction may not be stopped. Incidentally, the nitric acid amount of 1,000 ml/L refers to the case where the solution is wholly composed of nitric acid.

Besides, the amount of the oxidizing agent in the dissolving liquid in the case of using the oxidizing agent is normally not less than 50 g/L, preferably not less than 75 g/L and is normally not more than 500 g/L, preferably not more than 300 g/L. If the amount of the oxidizing agent is too small, the oxidizing power is so low that the reaction may not be stopped. On the other hand, if the amount is too large, economy may be low. In addition, the concentration of the acid such as hydrochloric acid and sulfuric acid used together with the oxidizing agent is normally not less than 10 g/L, preferably not less than 15 g/L and is normally not more than 500 g/L, preferably not more than 300 g/L. If the concentration of the acid is too low, it may be difficult to dissolve the substituent metal layer. On the other hand, if the concentration is too high, the solution may erode other members than the aluminum or aluminum alloy basis material. Incidentally, the acid used here is preferably a non-oxidizing acid, but it may be an oxidizing acid such as nitric acid or may be a mixture of an oxidizing acid and a non-oxidizing acid.

In the dissolving treatment as above-described, the treatment time is not particularly limited; for example, the dissolving treatment can be completed in a time of 5 to 300 seconds. The dissolving treatment may be conducted at a temperature of, for example, 10 to 40° C. Besides, during the dissolving treatment, the workpiece to be plated may be kept stationary or kept swinging, and the liquid may be agitated.

In forming a plating film after the surface treatment is conducted using the removing solution based on the present invention, the workpiece provided with the substituent metal film on the aluminum or aluminum alloy surface as above-mentioned may be subjected directly to a plating treatment or may be subjected to the plating treatment after the substituent metal layer is removed. In the latter case, since the oxide film on the aluminum or aluminum alloy surface has been removed completely, the subsequent electroless nickel plating, for example, results in that the aluminum of the basis material is replaced directly by nickel. In addition, after the substituent metal film is removed, the workpiece surface may be activated by a zinc substitution treatment, a palladium treatment or the like, before subjected to the plating treatment. Such an activating treatment is preferably conducted particularly by a zinc substitution treatment, more particularly an alkaline zinc substitution treatment to thereby form a zinc coating film on the aluminum or aluminum alloy surface, from the viewpoint of enhancing the adhesion of the plating film.

Here, the zinc substitution treatment refers specifically to a treatment of causing substitutive deposition of zinc by use of a solution containing a zinc salt. The alkaline zinc substitution treatment is a treatment conducted using an alkaline zincate solution. Besides, an acidic zinc substitution treatment is a treatment of causing substitutive deposition of zinc by use of an acidic zinc salt-containing solution. These treatments can be carried out by a known method. Further, the palladium treatment is a treatment of causing substitutive deposition of palladium by use of a solution containing a palladium salt, and can be carried out by a known method.

The formation of the zinc coating film as above-mentioned is conducted, particularly in the field of semiconductor devices, as a pre-treatment in the case of forming bumps by activating the surfaces of aluminum thin film electrodes patterned on a wafer and then conducting nickel plating, from the viewpoint of stable formation of the bumps. The zinc substitution treatment conducted in such a case is a treatment method which may lead to erosion of the aluminum or aluminum alloy basis material. However, the use of the removing solution based on the present invention ensures that the erosion of the aluminum thin film electrodes is restrained as securely as possible, so that even if the basis substrate is a little eroded by the zinc substitution treatment, the aluminum thin film electrodes will be left more assuredly upon the zinc substitution treatment.

The plating method for conducting the plating treatment after the surface of a workpiece is treated by the surface treatment method based on the present invention is not particularly limited, and may be an electroplating method or an electroless plating method.

The electroless plating method is lower in energy than the electroplating method, and, in carrying out the electroless plating method, a pre-treatment is particularly important for forming a plating layer without defects. According to the present invention, the impurities such as aluminum oxide film are completely removed, so that even the electroless plating method promises the formation of a plating layer with good adhesion.

Incidentally, when the electroplating method is adopted, wiring is needed, which leads to the problems that it takes long to assemble the equipment, it may be impossible to enhance the density of the plating, and it may be difficult to form a uniform plating film due to generation of noises. These problems can be solved by use of the electroless plating method.

The kind of the plating metal is appropriately selected according to the use thereof. Examples of the plating metal include Cu, Ni, and Au, and the plating layer may be composed of two or more layers of these plating metals.

EXAMPLES

Now, Examples and Comparative Examples will be shown below so as to described the present invention more specifically, but the invention is not limited to the following examples.

Examples 1 to 3, Comparative Example 1

A workpiece to be plated composed of a silicon plate coated with a 5 μm-thick aluminum layer by a sputtering method was immersed in each of removing solutions prepared in compositions shown in Table 1, at 50° C. for 60 seconds. The removing solutions each had a pH adjusted to 12.4. Thereafter, the workpiece was immersed in a 500 ml/L aqueous nitric acid solution at 21° C. for 1 minute, to dissolve away the metallic film formed on the aluminum layer of the workpiece by immersion in the removing solution. Further, an alkaline zinc substitution treatment was conducted by immersing the workpiece in an alkaline zincate solution, then the workpiece was plated with nickel in a thickness of 0.5 μm by an electroless plating method, and was further plated with gold in a thickness of 0.05 μm by a substitutive plating method.

The plated workpieces thus obtained were each subjected to observation of the appearance, and the state of the plating film was evaluated. In this case, the electroless nickel plating film was formed in a small thickness, and was coated further with the gold plating film. This ensures that in the case where the oxide film is left unremoved, deposition of nickel (and gold) does not occur, and the plating-lacking area is left as a hole (white in color) in the plating film. In view of this, the plating film-lacking state (oxide film remaining condition) was evaluated through comparison with gold color. The results are collectively shown in Table 1 below.

TABLE 1

| Concentration of ingredient in 1 L of water | | | Example 1 | Example 2 | Example 3 | Comparative Example 1 |
|---|---|---|---|---|---|---|
| Removing solution | Alkali (base) | | NaOH | NaOH | NaOH | NaOH |
| | Solubilizing agent | EDTA•2Na (g/L) | 10 | 10 | 10 | 10 |
| | Metallic salt (Metal concentration · g/L) | MnSO$_4$•5H$_2$O | 1 | | | |
| | | ZnSO$_4$•7H$_2$O | | 2 | | |
| | | CuSO$_4$•5H$_2$O | | | 0.05 | |
| | pH | | 12.4 | 12.4 | 12.4 | 12.4 |
| Appearance | | | good | good | good | bad |
| Microscopic observation of metal (×500) | | | no hole | no hole | no hole | many holes |

Examples 4 to 6, Comparative Example 2

A workpiece to be plated composed of a silicon plate coated with a 1 μm-thick Al—Si (Si content: 0.5 wt %) layer by a sputtering method was immersed in each of removing solutions prepared in compositions shown in Table 2, at 50° C. for 60 seconds. The removing solutions each had a pH adjusted to 12.4. Thereafter, the workpiece was immersed in a 500 ml/L aqueous nitric acid solution at 21° C. for 1 minute, to dissolve away the metallic film formed on the Al—Si layer of the workpiece by immersion in the removing solution. Further, an alkaline zinc substitution treatment was conducted by immersing the workpiece in an alkaline zincate solution, then the workpiece was plated with nickel in a thickness of 0.5 μm by an electroless plating method, and was further plated with gold in a thickness of 0.05 μm by a substitutive plating method. The plated workpieces thus obtained were each subjected to observation of the appearance, and the state of the plating film was evaluated. The results are collectively shown in Table 2 below.

TABLE 2

| Concentration of ingredient in 1 L of water | | | Example 4 | Example 5 | Example 6 | Comparative Example 2 |
|---|---|---|---|---|---|---|
| Removing solution | Alkali (base) | | NaOH | NaOH | NaOH | NaOH |
| | Solubilizing agent | EDTA•2Na (g/L) | 10 | 10 | 10 | 10 |
| | Surfactant | PEG-1000 (g/L) | 1 | 1 | 1 | 1 |
| | Metallic salt (Metal concentration · g/L) | MnSO$_4$•5H$_2$O | 1 | | | |
| | | ZnSO$_4$•7H$_2$O | | 2 | | |
| | | CuSO$_4$•5H$_2$O | | | 0.05 | |
| | pH | | 12.4 | 12.4 | 12.4 | 12.4 |
| Appearance | | | good | good | good | bad |
| Microscopic observation of metal (×500) | | | no hole | no hole | no hole | many holes |

Note)

PEG: polyethylene glycol

Examples 7 to 9, Comparative Example 3

A workpiece to be plated composed of a silicon plate coated with a 5 μm-thick aluminum layer by a sputtering method was immersed in each of removing solutions prepared in compositions shown in Table 3, at 50° C. for 60 seconds. The removing solutions each had a pH adjusted to 12.4. Thereafter, the workpiece was immersed in a 500 ml/L aqueous nitric acid solution at 21° C. for 1 minute, to dissolve away the metallic film formed on the aluminum layer of the workpiece by immersion in the removing solution. Further, an alkaline zinc substitution treatment was conducted by immersing the workpiece in an alkaline zincate solution, then the workpiece was plated with nickel in a thickness of 0.5 μm by an electroless plating method, and was further plated with gold in a thickness of 0.05 μm by a substitutive plating method.

The plated workpieces thus obtained were each subjected to observation of the appearance, and the state of the plating film was evaluated. In this case, the electroless nickel plating film was formed in a small thickness, and was coated further with the gold plating film. This ensures that in the case where the oxide film is left unremoved, deposition of nickel (and gold) does not occur, and the plating-lacking area is left as a hole (white in color) in the plating film. In view of this, the plating film-lacking state (oxide film remaining condition) was evaluated through comparison with gold color. The results are collectively shown in Table 3 below.

TABLE 3

| Concentration of ingredient in 1 L of water | | | Example 7 | Example 8 | Example 9 | Comparative Example 3 |
|---|---|---|---|---|---|---|
| Removing solution | Alkali (base) | | TMAH | TMAH | TMAH | TMAH |
| | Solubilizing agent | EDTA•2Na (g/L) | 10 | 10 | 10 | 10 |
| | Metallic salt (Metal concentration · g/L) | $MnSO_4 \cdot 5H_2O$ | 1 | | | |
| | | $ZnSO_4 \cdot 7H_2O$ | | 2 | | |
| | | $CuSO_4 \cdot 5H_2O$ | | | 0.05 | |
| | pH | | 12.4 | 12.4 | 12.4 | 12.4 |
| Appearance | | | good | good | good | bad |
| Microscopic observation of metal (×500) | | | no hole | no hole | no hole | many holes |

Examples 10 to 12, Comparative Example 4

A workpiece to be plated composed of a silicon plate coated with a 1 μm-thick Al—Si (Si content: 0.5 wt %) layer by a sputtering method was immersed in each of removing solutions prepared in compositions shown in Table 4, at 50° C. for 60 seconds. The removing solutions each had a pH adjusted to 12.4. Thereafter, the workpiece was immersed in a 500 ml/L aqueous nitric acid solution at 21° C. for 1 minute, to dissolve away the metallic film formed on the Al—Si layer of the workpiece by immersion in the removing solution. Further, an alkaline zinc substitution treatment was conducted by immersing the workpiece in an alkaline zincate solution, then the workpiece was plated with nickel in a thickness of 0.5 μm by an electroless plating method, and was further plated with gold in a thickness of 0.05 μm by a substitutive plating method. The plated workpieces thus obtained were each subjected to observation of the appearance, and the state of the plating film was evaluated. The results are collectively shown in Table 4 below.

TABLE 4

| Concentration of ingredient in 1 L of water | | | Example 10 | Example 11 | Example 12 | Comparative Example 4 |
|---|---|---|---|---|---|---|
| Removing solution | Alkali (base) | | TMAH | TMAH | TMAH | TMAH |
| | Solubilizing agent | EDTA•2Na (g/L) | 10 | 10 | 10 | 10 |
| | Surfactant | PEG-1000 (g/L) | 1 | 1 | 1 | 1 |
| | Metallic salt (Metal concentration · g/L) | $MnSO_4 \cdot 5H_2O$ | 1 | | | |
| | | $ZnSO_4 \cdot 7H_2O$ | | 2 | | |
| | | $CuSO_4 \cdot 5H_2O$ | | | 0.05 | |
| | pH | | 12.4 | 12.4 | 12.4 | 12.4 |
| Appearance | | | good | good | good | bad |
| Microscopic observation of metal (×500) | | | no hole | no hole | no hole | many holes |

Note)
PEG: polyethylene glycol

The invention claimed is:

1. A method for surface treatment of aluminum or aluminum alloy, comprising the steps of:
   immersing a workpiece comprising aluminum or aluminum alloy at least at one surface and having an aluminum oxide film on a surface of the aluminum or aluminum alloy in a dissolving solution; and
   forming a substituent metal layer of a metal, which is capable of substituting aluminum and contained in the solution on the aluminum or aluminum alloy surface, while removing the aluminum oxide film from the aluminum or the aluminum alloy surface, wherein
   the dissolving solution comprises:
   a salt or oxide of the metal capable for substituting aluminum;
   a solubilizing agent for ions of the metal; and
   an alkali, the dissolving solution having a pH of 10 to 13.5, wherein
   the metal is selected from the group consisting of manganese, cobalt, nickel, tin, lead, copper, mercury, silver, platinum, gold, and palladium;
   the concentration of the metal salt or metal oxide in the dissolving solution is not less than 1 mg/L but not more than 5,000 mg/L in terms of metal amount;
   the solubilizing agent is selected from the group consisting of aminocarboxylic acids and salts thereof, phosphorous acid chelating agents and salts thereof, and amine chelating agents;
   the total concentration of the solubilizing agent in the dissolving solution is 0.5 to 10 times (molar ratio) of the concentration of the metal salt or metal oxide.

2. The method according to claim 1, wherein the dissolving solution further comprises at least one surfactant selected from the group consisting of nonionic surfactants, anionic surfactants and cationic surfactants.

3. The method according to claim 1, wherein the dissolving solution has a pH of 12.4 to 13.5.

4. The method according to claim 1, wherein the workpiece comprises a body composed of a non-aluminum material; and the aluminum or aluminum alloy film formed on a surface of the body.

5. The method according to claim 1, further comprising the step of forming a plating layer on the substituent metal layer, after the substituent metal layer is formed.

6. The method according to claim 1, further comprising the step of removing the substituent metal layer by an acidic liquid having an oxidizing behavior, after the substituent metal layer is formed.

7. The method according to claim 6, further comprising the steps of:
   after the substituent metal layer is removed by the acidic liquid having the oxidizing behavior, subjecting the aluminum or aluminum alloy to a zinc substitution treatment or a palladium treatment; and
   plating a plating layer on the treated aluminum or aluminum alloy surface.

8. The method according to claim 6, further comprising the step of subjecting the aluminum or aluminum alloy directly to plating, after the substituent metal layer is removed by the acidic liquid having the oxidizing behavior.

9. The method according to claim 1, wherein the aluminum or aluminum alloy has a thickness of not more than 1.0 μm.

10. The method according to claim 1, wherein the metal is selected from the group consisting of cobalt, lead, mercury, silver, platinum, gold, and palladium.

11. The method according to claim 1, wherein the metal is selected from the group consisting of lead, mercury, silver, platinum, gold, and palladium.

12. The method according to claim 1, wherein the solubilizing agent is selected from the group consisting of aminocarboxylic acids and salts thereof.

13. The method according to claim 12, wherein the solubilizing agent is selected from the group consisting of aminocarboxylic acids and salts thereof.

14. The method according to claim 11, wherein the solubilizing agent is selected from the group consisting of aminocarboxylic acids and salts thereof.

15. The method according to claim 1, wherein the alkali is tetramethylammonium hydroxide.

16. The method according to claim 12, wherein the alkali is tetramethylammonium hydroxide.

17. The method according to claim 11, wherein the alkali is tetramethylammonium hydroxide.

18. The method according to claim 2, wherein the concentration of the surfactant in the removing solution is not less than 1 mg/L to not more than 5,000 mg/L.

19. A method for surface treatment of aluminum or aluminum alloy, comprising the steps of:
   immersing a workpiece comprising aluminum or aluminum alloy at least at one surface and having an aluminum oxide film on a surface of the aluminum or aluminum alloy in a dissolving solution, so as to form a substituent metal layer of a metal, which is capable of substituting aluminum and contained in the solution on the aluminum or aluminum alloy surface, while removing the aluminum oxide film from the aluminum or the aluminum alloy surface, wherein
   the dissolving solution comprises:
   a salt or oxide of the metal capable for substituting aluminum;
   a solubilizing agent for ions of the metal; and
   an alkali, the dissolving solution having a pH of 10 to 13.5, wherein
   the metal is selected from the group consisting of manganese, cobalt, nickel, tin, lead, copper, mercury, silver, platinum, gold, and palladium;
   the concentration of the metal salt or metal oxide in the dissolving solution is not less than 1 mg/L but not more than 5,000 mg/L in terms of metal amount;
   the solubilizing agent is selected from the group consisting of aminocarboxylic acids and salts thereof, phosphorous acid chelating agents and salts thereof, and amine chelating agents;
   the total concentration of the solubilizing agent in the dissolving solution is 0.5 to 10 times (molar ratio) of the concentration of the metal salt or metal oxide.

20. The method according to claim 19, wherein
   the workpiece is immersed in the dissolving solution for 1 to 20 minutes at temperature of 30 to 100° C., so as to form the substituent metal layer, while removing the aluminum oxide film from the aluminum or the aluminum alloy surface.

* * * * *